(12) United States Patent
Sakaguchi

(10) Patent No.: US 10,759,879 B2
(45) Date of Patent: Sep. 1, 2020

(54) ALKYL METALLOXANE COMPOUND AND METHOD FOR PRODUCING THE SAME

(71) Applicant: NICHIA CORPORATION, Anan-shi, Tokushima (JP)

(72) Inventor: Masakazu Sakaguchi, Tokushima (JP)

(73) Assignee: NICHIA CORPORATION, Anan-shi (JP)

( * ) Notice: Subject to any disclaimer, the term of this patent is extended or adjusted under 35 U.S.C. 154(b) by 102 days.

(21) Appl. No.: 16/140,129

(22) Filed: Sep. 24, 2018

(65) Prior Publication Data

US 2019/0092881 A1 Mar. 28, 2019

(30) Foreign Application Priority Data

Sep. 26, 2017 (JP) ................. 2017-184471
Sep. 5, 2018 (JP) ................. 2018-165625

(51) Int. Cl.
| | |
|---|---|
| *C07F 5/00* | (2006.01) |
| *C07F 5/06* | (2006.01) |
| *C08F 4/642* | (2006.01) |
| *C08F 4/6592* | (2006.01) |
| *C08F 212/08* | (2006.01) |
| *C08F 210/02* | (2006.01) |
| *C08F 4/659* | (2006.01) |
| *C08F 10/02* | (2006.01) |

(52) U.S. Cl.
CPC .............. *C08F 4/6428* (2013.01); *C07F 5/00* (2013.01); *C07F 5/068* (2013.01); *C08F 4/65908* (2013.01); *C08F 10/02* (2013.01); *C08F 210/02* (2013.01); *C08F 212/08* (2013.01); *C08F 4/65925* (2013.01)

(58) Field of Classification Search
CPC .. C08F 4/6592; C08F 4/65912; C08F 212/08; C07F 5/068; C07F 5/00
See application file for complete search history.

(56) References Cited

U.S. PATENT DOCUMENTS

| | | |
|---|---|---|
| 4,935,474 A | 6/1990 | Ewen et al. |
| 5,719,241 A | 2/1998 | Razavi et al. |

FOREIGN PATENT DOCUMENTS

JP H06-322014 A 11/1994

*Primary Examiner* — Caixia Lu
(74) *Attorney, Agent, or Firm* — Hunton Andrews Kurth LLP

(57) ABSTRACT

An alkyl metalloxane compound and a method of producing the same are provided. The alkyl metalloxane compound includes one or more alkyl aluminoxane structural units, and one or more alkyl galloxane structural units per molecule. The method comprises reacting trialkyl gallium, trialkyl aluminum, and water.

16 Claims, No Drawings

ALKYL METALLOXANE COMPOUND AND METHOD FOR PRODUCING THE SAME

CROSS-REFERENCE TO RELATED APPLICATIONS

This application claims priority to Japanese Patent Application No. 2017-184471, filed on Sep. 26, 2017 and Japanese Patent Application No. 2018-165625, filed on Sep. 5, 2018, the disclosures of which are hereby incorporated by reference in their entireties.

TECHNICAL FIELD

The present disclosure relates to an alkyl metalloxane compound, and a method of producing the alkyl metalloxane compound.

DESCRIPTION OF THE RELATED ART

A metallocene compound is known to be used as a primary catalyst of a polymerization catalyst for olefins in combination with a co-catalyst such as methyl aluminoxane (MAO). Such a polymerization catalyst typically produces a polyolefin with a narrow molecular weight distribution. Polyolefins with a broad molecular weight distribution are known to exhibit improved physical properties such as impact resistance and heat resistance attributable to its high molecular weight components, and improved moldability attributable to its low molecular weight components. A method of producing a polyolefin with a broad molecular weight distribution may use two or more metallocene compounds (see, for example, Specification of U.S. Pat. No. 4,935,474 and Japanese Patent Application Publication No. H06-322014).

SUMMARY

A method of producing an alkyl metalloxane compound is provided. The method includes reacting trialkyl gallium, trialkyl aluminum, and water. An alkyl metalloxane compound is also provided. The alkyl metalloxane compound contains one or more alkyl aluminoxane structural units and one or more alkyl galloxane structural units. The alkyl metalloxane compound can be used as a co-catalyst of a metallocene catalyst.

DETAILED DESCRIPTION

In this specification, when a component contained in a composition has a plurality of corresponding substances, the amount of the component indicates the total amount of its corresponding substances present in the composition unless otherwise specified. Embodiments of the present invention will now be described in detail. However, the embodiments described below are mere examples of the alkyl metalloxane compound and the method for producing the alkyl metalloxane compound for embodying the technical concept of the present invention, and the present invention is not limited to the alkyl metalloxane compound and the method for producing the alkyl metalloxane compound described below.

Alkyl Metalloxane Compound

The alkyl metalloxane compound according to the present disclosure contains an alkyl aluminoxane structural unit and an alkyl galloxane structural unit. The alkyl metalloxane compound containing both an alkyl aluminoxane structure unit and an alkyl galloxane structure unit enables production of a polyolefin with a broad molecular weight distribution even when used in combination with a typical metallocene compound for olefin polymerization.

This can be analyzed as follows. Methyl aluminoxane (MAO) is typically used as a co-catalyst in combination with a metallocene compound. An olefin polymerization catalyst containing MAO and a metallocene compound serves as a single-site catalyst, and produces a polyolefin with a narrow molecular weight distribution. The alkyl metalloxane compound according to the present disclosure that serves as a co-catalyst contains gallium in addition to aluminum as a metal element. Thus, in contrast to an olefin polymerization catalyst containing MAO and a metallocene compound, an olefin polymerization catalyst containing the alkyl metalloxane compound according to the present disclosure and a metallocene compound may serve as a multi-site catalyst, and produces a polyolefin with a broad molecular weight distribution. The metallocene compound used in combination with the alkyl metalloxane compound may be a single metallocene compound.

The alkyl metalloxane compound according to the present embodiment may have a low solubility in a solvent. This property may reduce fouling of a reactor used in polymerization with a resulting polymer.

There have been findings that alkyl galloxane, which is an alkyl metalloxane compound, might be usable as a co-catalyst of a metallocene compound. However, no known examples have demonstrated its practical catalytic activity. The alkyl metalloxane compound according to the present embodiment contains both an alkyl aluminoxane structural unit and an alkyl galloxane structural unit in a molecule, and exhibits a higher catalytic activity than where alkyl aluminoxane alone is used as a co-catalyst.

The alkyl aluminoxane structural unit is represented by, for example, a partial structural formula (1) below, and the alkyl galloxane structural unit is represented by, for example, a partial structural formula (2) below.

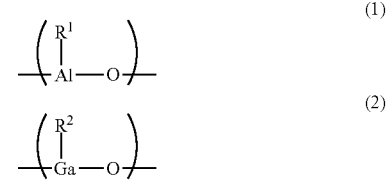

In the formulas, $R^1$ and $R^2$ each independently represent an alkyl group with a carbon number of 1 to 6. The alkyl group denoted by $R^1$ or $R^2$ may be either linear or branched. The alkyl group may have a ring structure. Specific examples of the alkyl group with a carbon number of 1 to 6 include methyl, ethyl, propyl, isopropyl, cyclopropyl, butyl, sec-butyl, tert-butyl, cyclobutyl, cyclopropylmethyl, pentyl, 1-methylbutyl, 2-methylbutyl, 3-methylbutyl, 1,1-dimethylpropyl, 1,2-dimethylpropyl, 2,2-dimethylpropyl, cyclopentyl, cyclopropylethyl, hexyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, and cyclohexyl. $R^1$ or $R^2$ preferably may have a carbon number of 1 to 4, and more preferably 1 to 3 to exhibit a higher polymerization activity.

The alkyl metalloxane compound may contain the alkyl aluminoxane structural units and the alkyl galloxane structural units each in a block structure, or in a random manner.

The alkyl metalloxane compound may contain the same alkyl aluminoxane structural units and the same alkyl galloxane structural units, or two or more different alkyl aluminoxane structural units and two or more different alkyl galloxane structural units in combination. The two or more different alkyl aluminoxane structural units or two or more different alkyl galloxane structural units may contain alkyl aluminoxane structural units or alkyl galloxane structural units that contain, for example, different alkyl groups from one another.

The alkyl metalloxane compound may have the ratio of the total number of alkyl galloxane structural units to the total number of alkyl aluminoxane structural units of, for example, 0.001 or more, preferably 0.002 or more, more preferably 0.003 or more, and still more preferably 0.005 or more, and also, for example, 1.7 or less, preferably 1.1 or less, more preferably 0.7 or less, and still more preferably 0.5 or less to exhibit an appropriate co-catalytic activity. The ratio of the total number of alkyl galloxane structural units to the total number of the alkyl aluminoxane structural units in the metalloxane compound is not limited to the ratios described above, and may be appropriately selected by, for example, the purpose.

The alkyl metalloxane compound may have a gallium content of, for example, 0.05% by weight or more, preferably 0.1% by weight or more, and more preferably 0.2% by weight or more, and also, for example, 61% by weight or less, preferably 40% by weight or less, and more preferably 30% by weight or less to exhibit an appropriate polymerization activity. The alkyl metalloxane compound may have an aluminum content of, for example, 14% by weight or more, preferably 18% by weight or more, and more preferably 20% by weight or more, and, for example, 43% by weight or less, preferably 40% by weight or less, and more preferably 38% by weight or less to exhibit an superior polymerization activity.

The alkyl metalloxane compound may further contain other alkyl metalloxane structural units in addition to the alkyl aluminoxane structural units and the alkyl galloxane structural units. Examples of the other structural units include alkylboroxane structural units.

The alkyl metalloxane compound may be subjected to, for example, proton nuclear magnetic resonance (NMR) spectroscopy to confirm the presence of alkyl groups in the spectrum. The presence of the aluminoxane structures and the galloxane structures can be determined, for example, by an infrared absorption (IR) spectrum showing a characteristic absorption at around 600 cm$^{-1}$. Further, the gallium and aluminum contents of the alkyl metalloxane compound can be measured by, for example, inductively coupled plasma (ICP) emission spectroscopic analysis, and its carbon and hydrogen contents are measured using an elemental analyzer. The alkyl metalloxane compound may be efficiently produced by, for example, the method described below.

Method of Producing Alkyl Metalloxane Compound

The method of producing the alkyl metalloxane compound includes reacting trialkyl gallium, trialkyl aluminum, and water. Trialkyl gallium and trialkyl aluminum are caused to react with each other through water molecules. Thus, an alkyl metalloxane compound containing one or more alkyl galloxane structural units and one or more alkyl aluminoxane structural units, and having a partial structure where these units are directly bonded with one another is efficiently produced. The resulting alkyl metalloxane compound can serve, in combination with a metallocene compound, as a catalyst having an olefin polymerization activity.

The production method uses trialkyl aluminum represented by, for example, the structural formula (3) below, and trialkyl gallium represented by the structural formula (4) below.

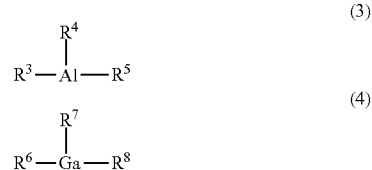

In formula (3), each of $R^3$, $R^4$ and $R^5$ independently represents an alkyl group with a carbon number of 1 to 6. $R^3$, $R^4$ and $R^5$ may be the same or different. In formula (4), each of $R^6$, $R^7$ and $R^8$ independently represents an alkyl group with a carbon number of 1 to 6. $R^6$, $R^7$ and $R^8$ may be the same or different. In formula (3), $R^3$, $R^4$ and $R^5$ each independently may be the same as $R^1$ in formula (1). In formula (4), $R^6$, $R^7$ and $R^8$ each independently may be the same as $R^2$ in formula (2).

The method of producing an alkyl metalloxane compound may use a solvent as appropriate. Examples of the solvent include aromatic hydrocarbon solvents such as toluene, and non-aromatic hydrocarbon solvents such as n-hexane. The solvent may be dehydrated. The method of producing a metalloxane compound may be carried out at a reaction temperature of, for example, −20° C. to 100° C., and preferably −10° C. to 50° C. This reaction is carried out, for example, for 1 hour or more, and preferably 3 hours or more, and also, for example, 30 hours or less, and preferably 20 hours or less. The alkyl metalloxane compound may be produced by this method in an inert gas atmosphere, such as nitrogen or argon.

In the method of producing an alkyl metalloxane compound, the amount of trialkyl gallium and the amount of trialkyl aluminum may be appropriately determined by the composition of the desired alkyl metalloxane compound. In the method, the molar ratio of trialkyl gallium (TAG) to trialkyl aluminum (TAA), or TAG/TAA, may be, for example, 0.5 to 2.0, and preferably 0.7 to 1.1.

In the method of producing an alkyl metalloxane compound, water may be used in a molar ratio of water to trialkyl gallium (water/TAG) of, for example, 2 or less, preferably 1.5 or less, and more preferably 1.1 or less, and also, for example, 0.9 or more, preferably 0.95 or more, and more preferably 0.98 or more for efficient production of an alkyl metalloxane compound.

Specifically, an alkyl metalloxane compound may be produced by the method including, for example, reacting trialkyl gallium and water to obtain a partially hydrolyzed product, and reacting the partially hydrolyzed product with trialkyl aluminum. In this method, trialkyl gallium is reacted with water in advance to obtain a partially hydrolyzed product containing, for example, dialkyl gallium hydroxide, and the resulting partially hydrolyzed product is then reacted with trialkyl aluminum. This method efficiently produces a desired alkyl metalloxane compound.

Trialkyl gallium and water may be reacted at, for example, −20° C. to 50° C., and preferably −10° C. to 10° C. The reaction may be carried out, for example, for 1 hour or more, and preferably 3 hours or more, and also, for example, 30 hours or less, and preferably 20 hours or less.

The partially hydrolyzed product and trialkyl aluminum may then be reacted at, for example, −20° C. to 100° C., and preferably −10° C. to 50° C. The reaction may be carried out for, for example, 1 hour or more, and preferably 3 hours or more, and also, for example, 30 hours or less, and preferably 20 hours or less. The reaction between the partially hydrolyzed product and trialkyl aluminum may be carried out with heat treatment as appropriate. The heat treatment may be carried out at, for example, 40° C. to 200° C., and preferably 50° C. to 100° C. for, for example, 1 hour to 20 hours, and preferably 2 hours to 12 hours.

Co-Catalyst for Metallocene Catalyst

The co-catalyst of a metallocene catalyst may contain at least one of the alkyl metalloxane compounds described above. The co-catalyst containing the alkyl metalloxane compound may activate, for example, a metallocene compound that serves as a primary catalyst for olefin polymerization.

The co-catalyst of a metallocene catalyst may further contain other compounds, in addition to the alkyl metalloxane compound, that can activate a metallocene compound. Examples of the other compounds include trialkylaluminums such as trimethylaluminum, triethylaluminum, tri-isobutylaluminum, and tri-n-octylaluminum; alkylaluminum halides such as methylaluminum dichloride, ethylaluminum dichloride, dimethylaluminum chloride, and diethylaluminum chloride; and borate compounds such as dimethylphenylammonium tetrakis(pentafluorophenyl)borate, trityl tetrakis(pentafluorophenyl)borate, tris(pentafluorophenyl)boron, and tris(pentabromophenyl)boron.

The co-catalyst containing other compounds in addition to the alkyl metalloxane compound may contain the other compounds in an amount of, for example, 99% by weight or less, preferably 20% by weight or less, and more preferably less than 1% by weight, and also, for example, 0.01% by weight or more.

Olefin Polymerization Catalyst

The olefin polymerization catalyst may contain at least one of the alkyl metalloxane compounds described above, and at least one metallocene compound. The olefin polymerization catalyst containing the alkyl metalloxane compound serving as a co-catalyst of, for example, a metallocene compound can exhibit a superior olefin polymerization activity. When used for the production of a homopolymer, the olefin polymerization catalyst can efficiently produce a polyolefin with, for example, a broad molecular weight distribution. When used for the production of a copolymer, the olefin polymerization catalyst can efficiently produce, for example, a stereoregular polyolefin.

The alkyl metalloxane compound contained in the olefin polymerization catalyst is as detailed above. One of the alkyl metalloxane compounds may be used alone, or two or more of them may be used in combination. The olefin polymerization catalyst may further contain other alkyl metalloxane compounds as appropriate in addition to the alkyl metalloxane compounds described above. Specific examples of the other alkyl metalloxane compounds include an alkyl metalloxane compound containing for example, alkyl aluminoxane structural units.

The metallocene compound is an organic metal complex having two cyclopentadienyl anions as $\eta^5$-ligands. Examples of the metal contained in the metallocene compound include Group 4 elements such as zirconium, titanium, and hafnium. The metal contained in the metallocene compound may contain at least one selected from the group consisting of zirconium and titanium to exhibit an appropriate polymerization activity. The metallocene compound may contain at least one selected from the group consisting of a zirconocene compound and titanocene compound to exhibit an appropriate polymerization activity. The $\eta^5$-ligands are not limited to the cyclopentadienyl anions, but may be, for example, indenyl anions, or pentamethylcyclopentadienyl anions. The two $\eta^5$-ligands may be linked through any linking group. The metallocene compound may contain a hydrogen atom or a substituent in addition to the $\eta^5$-ligands. Examples of the substituent include a halogen atom such as chlorine or bromine; an alkyl group such as methyl, ethyl, and isopropyl; an aryl group such as phenyl; a substituted silyl group such as trimethylsilyl; and an alkoxy group such as methoxy, ethoxy, and isopropoxy.

Specific examples of the metallocene compound include the metallocene compounds described in International Patent Publication No. WO 2010/055652, International Patent Publication No. WO 2004/081064, and Japanese Patent Application Publication No. H03-163088, those which are incorporated by reference. One of the metallocene compounds may be used alone, or two or more of them may be used in combination.

The molar ratio of the alkyl metalloxane compound to the metallocene compound in an olefin polymerization catalyst may be, for example, 0.1 or more, and preferably 10 or more, and also, for example, 100,000 or less, and preferably 20,000 or less.

Examples of the olefin compound to be polymerized with an olefin polymerization catalyst include ethylene, a linear or branched α-olefin, a cyclic olefin, an α,β-unsaturated carboxylic acid and a salt thereof, an α,β-unsaturated carboxylic acid ester, a vinyl ester, an unsaturated glycidyl, and an aromatic vinyl compound. At least one selected from these is preferable. One of the olefin compounds may be used alone or two or more of them may be used in combination.

The linear or branched α-olefin may have a carbon number of, for example, 3 to 20, and preferably 3 to 10. Specific examples include propylene, 1-butene, 2-butene, 1-pentene, 3-methyl-1-butene, 3-methyl-1-pentene, 3-ethyl-1-pentene, 1-hexene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene.

The cyclic olefin may have a carbon number of, for example, 3 to 30, and preferably 3 to 20, or 4 to 20. Specific examples include cyclopentene, cycloheptene, norbornene, 5-methyl-2-norbornene, tetracyclododecene, and 2-methyl 1,4,5,8-dimethano-1,2,3,4,4a,5,8,8a-octahydronaphthalene.

Examples of the α,β-unsaturated carboxylic acid include acrylic acid, methacrylic acid, fumaric acid, maleic anhydride, itaconic acid, itaconic anhydride, and bicyclo[2.2.1]-5-heptene-2,3-dicarboxylic anhydride. Examples of the salt thereof include metal salts such as a lithium salt, a sodium salt, a potassium salt, a zinc salt, a magnesium salt, and a calcium salt. Examples of the α,β-unsaturated carboxylic acid ester include methyl acrylate, ethyl acrylate, n-propyl acrylate, isopropyl acrylate, n-butyl acrylate, isobutyl acrylate, tert-butyl acrylate, 2-ethylhexyl acrylate, methyl methacrylate, ethyl methacrylate, n-propyl methacrylate, isopropyl methacrylate, n-butyl methacrylate, and isobutyl methacrylate. Examples of the vinyl ester include vinyl acetate, vinyl propionate, vinyl caproate, vinyl caprate, vinyl laurate, vinyl stearate, and vinyl trifluoroacetate. Examples of the unsaturated glycidyl include glycidyl acrylate, glycidyl methacrylate, and itaconic acid monoglycidyl ester.

Examples of the aromatic vinyl compound include styrene; mono- or poly-alkyl-styrene such as 2-methylstyrene, 3-methylstyrene, 4-methylstyrene, 2,4-dimethylstyrene, 2-ethylstyrene, 3-ethylstyrene, and 4-ethylstyrene; functional group-containing styrene derivatives such as methoxystyrene, ethoxystyrene, vinylbenzoic acid, methyl vinylbenzoate, vinylbenzyl acetate, hydroxystyrene, 2-chlorostyrene, 4-chlorostyrene, and divinylbenzene; and 3-phenyl propylene and α-methyl styrene.

The olefin polymerization catalyst may further contain other co-catalysts in addition to the alkyl metalloxane compound as appropriate. Specific examples of the other co-catalysts are as described above.

The olefin polymerization catalyst may be prepared by, for example, mixing the alkyl metalloxane compound and a metallocene compound. Alternatively, the olefin polymerization catalyst may be prepared by adding a metallocene compound to a mixture of the alkyl metalloxane compound and an olefin compound.

Method of Producing Polyolefin

The method of producing a polyolefin may include contacting the olefin polymerization catalyst and an olefin compound. The olefin polymerization catalyst enables efficient production of a desired polyolefin.

A polyolefin can be produced by contacting the olefin polymerization catalyst containing the alkyl metalloxane compound and a metallocene compound with a desired olefin compound. Alternatively, a polyolefin may be produced by adding a metallocene compound to a mixture of the alkyl metalloxane compound and an olefin compound.

In the method of producing a polyolefin, the olefin polymerization catalyst may contain the alkyl metalloxane compound at a concentration in a solvent of, for example, $10^{-7}$ mmol/l or more, and preferably $10^{-5}$ mmol/l or more, and also, for example, $10^3$ mmol/l or less, and preferably $10^2$ mmol/l or less. A polyolefin may be produced under normal pressure or a pressure higher than normal pressure. Specifically, the pressure may be, for example, 20 MPa or less, and preferably 10 MPa or less.

The olefin polymerization catalyst and an olefin compound may be contacted at, for example, −50° C. to 200° C., and preferably −20° C. to 100° C.

In the method of producing a polyolefin, for example, ethylene or α-olefin may be used as an olefin compound to produce a polyolefin with a broad molecular weight distribution. The resulting polyolefin may have a molecular weight distribution expressed by Mw/Mn of, for example, 2.8 or more, and preferably 3 or more, and also, for example, 12 or less. Mw denotes a weight-average molecular weight, and Mn denotes a number-average molecular weight; both are calculated by standard polystyrene conversion from gel permeation chromatography (GPC). As an olefin compound, for example, an aromatic vinyl compound such as styrene and ethylene or α-olefin may be used to produce a stereoregular copolymer of an aromatic vinyl compound and ethylene or α-olefin. The resulting copolymer may have an isotactic dyad fraction of, for example, 0.5 or more, and preferably 0.7 or more. A content of an aromatic vinyl compound in the resulting copolymer may be, for example, 30 molar % or more and 80 molar % or less. A metallocene compound used for producing the copolymer may contain titanium or may be a titanocene compound to exhibit an appropriate polymerization activity.

EXAMPLES

The present invention will now be described more specifically with reference to examples, but the present invention is not limited to these examples.

In the examples and comparative examples described below, the resulting catalytic components, or the alkyl metalloxane compounds, are analyzed by the means described below.

(1) Nuclear Magnetic Resonance (NMR) Spectrum Measurement

NMR spectra were determined using Varian NMR System 600 in a deuterated dimethyl sulfoxide solvent with tetramethylsilane (TMS) as a reference.

(2) Infrared Absorption (IR) Spectrum Measurement

IR spectrum measurement by infrared spectroscopy was carried out using Nicolet iS5 FT-IR (by Thermo Fisher Scientific).

(3) Analysis of Gallium (Ga) and Aluminum (Al) Contents

Ga and Al contents of the alkyl metalloxane compounds were determined by inductively coupled plasma (ICP) emission spectroscopic analysis. Specifically, the alkyl metalloxane compounds were hydrolyzed with hydrochloric acid, and then Ga and Al contents were measured at room temperature using an ICP emission spectroscopic analyser (SPS3100 by SII NanoTechnology) based on Ga and Al reference samples.

(4) Analysis of Carbon (C) and Hydrogen (H) Contents

C/H elemental analysis was carried out using an elemental analyzer (2400 II by Perkin Elmer) to calculate carbon atom and hydrogen atom contents.

Polyolefins (polymers) obtained through the examples and comparative examples were analyzed by the means described below.

(1) NMR Measurement

NMR spectra were measured by Varian NMR System 600 using a deuteriochloroform solvent or deuterated 1,1,2,2-tetrachloroethane with TMS as a reference. $^{13}$C-NMR spectrum measurement for quantifying peak areas was carried out by proton-gated decoupling without nuclear overhauser effect (NOE). Styrene content of each resulting polymer was determined by the intensity comparison of its phenyl-derived peak (6.0 to 7.5 ppm) and its alkyl group-derived proton peak (0.5 to 3 ppm) by $^1$H-NMR measurement with TMS as a reference. NMR spectrum attribution was determined based on the attribution described in Macromolecules, vol. 13, 849-852 (1980) and Japanese Patent Application Publication H09-309925.

(2) Molecular Weight Measurement

In the examples and comparative examples, the molecular weights were determined as weight-average molecular weights and number-average molecular weights by standard polystyrene conversion from gel permeation chromatography (GPC). Specifically, the molecular weights were measured with HLC-8321GPC/HT (by Tosoh) using o-dichlorobenzene as a solvent.

Example 1

Synthesis of Alkyl Metalloxane Compound: Catalytic Component A

A four-necked 200-mL flask with a thermometer and a rotator was dried under reduced pressure, and then purged with nitrogen. To the flask, 6 mL of a solution of trimethyl gallium in toluene (containing 26 mmol of trimethyl gallium) and 16 mL of dehydrated toluene were added, and the mixture was cooled to −5° C. and stirred. Subsequently, 0.5 g (28 mmol) of deoxygenated water, which had been degassed with nitrogen overnight, was added dropwise with a syringe pump adjusted to a flow rate of 2.5 μL/min, and stirring was continued at −5° C. for 17 hours under nitrogen atmosphere. The temperature was then raised to 0° C., and 26 mL of a solution of trimethyl aluminum in toluene (containing 26 mmol of trimethyl aluminum) (by Sigma-Aldrich) was slowly added dropwise over 2 hours, and stirring was continued for another 2 hours at a temperature maintained at 0° C. The temperature was raised to 60° C., and the mixture was allowed to react for 10 hours. Subsequently, the solvent was distilled off under reduced pressure to obtain 2.3 g of white powder. The yield was 103% in terms of aluminum.

The IR spectrum of the resultant alkyl metalloxane compound was determined. Major peaks were as described below. The elemental analysis values (% by weight) of the resultant alkyl metalloxane compound were as described below.

IR: 2954 $cm^{-1}$, 1207 $cm^{-1}$, 1018 $cm^{-1}$, 651 $cm^{-1}$

Elemental analysis values: C: 23.9%, H: 6.36%, Ga: 9.6%, Al: 32.2%

Subsequently, to a 200-mL four-necked flask purged with nitrogen, the alkyl metalloxane compound obtained above was added, and stirred in 85 ml of dehydrated toluene at room temperature (25° C.) for 30 min, and the mixture was filtered through a glass filter G4. The filtrate was analyzed for Ga and Al contents through ICP emission spectroscopic analysis. Neither Ga nor Al was detected. This demonstrated that the alkyl metalloxane compound has low solubility in toluene.

Example 2

Synthesis of Alkyl Metalloxane Compound: Catalytic Component B

A four-necked 200-mL flask with a thermometer and a rotator was dried under reduced pressure, and then purged with nitrogen. To the flask, 10 mL of a solution of trimethyl gallium in toluene (containing 43 mmol of trimethyl gallium) and 30 mL of dehydrated toluene were added, and the mixture was cooled to −5° C. and stirred. Subsequently, 0.77 g (43 mmol) of deoxygenated water, which had been degassed with nitrogen overnight, was added dropwise with a syringe pump adjusted to a flow rate of 2.5 µL/min, and stirring was continued at a temperature maintained at −5° C. for 16 hours under nitrogen atmosphere. The temperature was then raised to 0° C., and 44 mL of a solution of trimethyl aluminum in toluene (containing 43 mmol of trimethyl aluminum) (by Sigma-Aldrich) was slowly added dropwise over 4 hours, and stirring was continued for another 1 hour at a temperature maintained at 0° C. The temperature was raised to 60° C., and the mixture was allowed to react for 10 hours. Subsequently, the solvent was distilled off under reduced pressure to obtain 3.7 g of white powder. The yield was 109% in terms of aluminum.

The resultant alkyl metalloxane compound showed an IR spectrum with major peaks shown below, and elemental analysis values shown below.

IR: 2945 $cm^{-1}$, 1209 $cm^{-1}$, 655 $cm^{-1}$

Elemental analysis values: C: 26.4%, H: 6.13%, Ga: 6.4%, Al: 34.4%

Example 3

Synthesis of Alkyl Metalloxane Compound: Catalytic Component C

A four-necked 200-mL flask with a thermometer and a rotator was dried under reduced pressure, and then purged with nitrogen. To the flask, 12 mL of a solution of trimethyl gallium in toluene (containing 52 mmol of trimethyl gallium) and 36 mL of dehydrated toluene were added, and the mixture was cooled to −5° C., and stirred. Subsequently, 0.95 g (53 mmol) of deoxygenated water, which had been degassed with nitrogen overnight, was added dropwise with a syringe pump adjusted to a flow rate of 2.5 µL/min, and stirring was continued at a temperature maintained at −5° C. for 15 hours under nitrogen atmosphere. The temperature was then raised to 0° C., and 62 mL of a solution of trimethyl aluminum in toluene (containing 62 mmol of trimethyl aluminum) (by Sigma-Aldrich) was slowly added dropwise over 4.5 hours, and stirring was continued for another 30 min at a temperature maintained at 0° C. The temperature was raised to 60° C., and the mixture was allowed to react for 10 hours. Subsequently, the solvent was distilled off under reduced pressure to obtain 4.2 g of white powder. The yield was 77% in terms of aluminum.

The resultant alkyl metalloxane compound showed an IR spectrum with major peaks shown below, and elemental analysis values shown below.

IR: 2946 $cm^{-1}$, 1209 $cm^{-1}$, 1002 $cm^{-1}$, 648 $cm^{-1}$

Elemental analysis values: C: 28.3%, H: 7.48%, Ga: 0.4%, Al: 30.4%

Example 4

Synthesis of Alkyl Metalloxane Compound: Catalytic Component D

A four-necked 200-mL flask with a thermometer and a rotator was dried under reduced pressure, and then purged with nitrogen. To the flask, 7 mL of a solution of trimethyl gallium in toluene (containing 30 mmol of trimethyl gallium) and 21 mL of dehydrated toluene were added, and the mixture was cooled to −5° C. and stirred. Subsequently, 0.55 g (31 mmol) of deoxygenated water, which had been degassed with nitrogen overnight, was added dropwise with a syringe pump adjusted to a flow rate of 2.5 µL/min, and stirring was continued at a temperature maintained at −5° C. for 16 hours under nitrogen atmosphere. The temperature was then raised to 0° C., and 35 mL of a solution of trimethyl aluminum in toluene (containing 36 mmol of trimethyl aluminum) (by Sigma-Aldrich) was slowly added dropwise over 2 hours, and stirring was continued for another 2 hours at a temperature maintained at 0° C. The temperature was raised to 60° C., and the mixture was allowed to react for 10 hours. Subsequently, the solvent was distilled off under reduced pressure to obtain 2.8 g of white powder. The yield was 90% in terms of aluminum.

The resultant alkyl metalloxane compound showed an IR spectrum with major peaks shown below, and elemental analysis values shown below.

IR: 2942 $cm^{-1}$, 1211 $cm^{-1}$, 996 $cm^{-1}$, 641 $cm^{-1}$

Elemental analysis values: C: 31.5%, H: 7.37%, Ga: 1.4%, Al: 31.8%

Example 5

Synthesis of Alkyl Metalloxane Compound: Catalytic Component E

A four-necked 200-mL flask with a thermometer and a rotator was dried under reduced pressure, and then purged with nitrogen. To the flask, 12 mL of a solution of trimethyl gallium in toluene (containing 52 mmol of trimethyl gallium) and 36 mL of dehydrated toluene were added, and the mixture was cooled to −5° C. and stirred. Subsequently, 0.94 g (52 mmol) of deoxygenated water, which had been degassed with nitrogen overnight, was added dropwise with a syringe pump adjusted to a flow rate of 2.5 µL/min, and stirring was continued at a temperature maintained at −5° C.

for 15 hours under nitrogen atmosphere. The temperature was then raised to 0° C. and 51 mL of a solution of trimethyl aluminum in toluene (containing 51 mmol of trimethyl aluminum) (by Sigma-Aldrich) was slowly added dropwise over 5 hours, and stirring was continued for another 1 hour at a temperature maintained at 0° C. The temperature was then raised to 60° C., and the mixture was allowed to react for 10 hours. Subsequently, the solvent was distilled off under reduced pressure to obtain 4.2 g of white powder. The yield was 68% in terms of aluminum.

The resultant alkyl metalloxane compound showed an IR spectrum with major peaks shown below, and elemental analysis values shown below.

IR: 2941 cm$^{-1}$, 1211 cm$^{-1}$, 1066 cm$^{-1}$, 648 cm$^{-1}$

Elemental analysis values: C: 27.8%, H: 7.15%, Ga: 2.0%, Al: 27.4%

In NMR measurement, a single peak attributable to a methyl group each appeared at −0.62 ppm in $^1$H-NMR and at −3.26 ppm in $^{13}$C-NMR. Also, a broad peak appeared in the range of −0.65 ppm to −1.3 ppm in $^1$H-NMR, which is seemingly attributable to the methyl group of MAO unit.

Example 6

Synthesis of Alkyl Metalloxane Compound: Catalytic Component F

A four-necked 200-mL flask with a thermometer and a rotator was dried under reduced pressure, and then purged with nitrogen. To the flask, 8 mL of a solution of trimethyl gallium in toluene (containing 34.4 mmol of trimethyl gallium) and 24 mL of dehydrated toluene were added, and the mixture was cooled to −5° C. and stirred. Subsequently, 0.634 g (35.2 mmol) of deoxygenated water, which had been degassed with nitrogen overnight, was added dropwise with a syringe pump adjusted to a flow rate of 2.5 μL/min, and stirring was continued at a temperature maintained at −5° C. for 17 hours under nitrogen atmosphere. The temperature was then raised to 0° C., and 34 mL of a solution of trimethyl aluminum in toluene (containing 34 mmol of trimethyl aluminum) (by Sigma-Aldrich) was slowly added dropwise over 2 hours, and stirring was continued for another 2 hours at a temperature maintained at 0° C. The temperature was raised to 50° C., and the mixture was allowed to react for 2 hours, and then cooled to 0° C. To this, 0.319 g (17.7 mmol) of deoxygenated water, which had been degassed with nitrogen overnight, was added dropwise with a syringe pump adjusted to a flow rate of 2.5 μL/min, and stirring was continued for 16 hours at room temperataure. Subsequently, the solvent was distilled off under reduced pressure to obtain 4.8 g of white powder. The yield was 116% in terms of aluminum.

The resultant alkyl metalloxane compound showed an IR spectrum with major peaks shown below, and elemental analysis values shown below.

IR: 2956 cm$^{-1}$, 1210 cm$^{-1}$, 724 cm$^{-1}$, 667 cm$^{-1}$, 585 cm$^{-1}$, 536 cm$^{-1}$

Elemental analysis values: C: 25.5%, H: 5.64%, Ga: 25.5%, Al: 21.9%

Comparative Example 1

Synthesis of Methyl galloxane: Catalytic Component G (MGO)

A four-necked 200-mL flask with a thermometer and a rotator was dried under reduced pressure, and then purged with nitrogen. To the flask, 12 mL of a solution of trimethyl gallium in toluene (containing 50 mmol of trimethyl gallium) and 30 mL of dehydrated toluene were added, and the mixture was cooled to −5° C. and stirred. Subsequently, 0.92 g (51 mmol) of deoxygenated water, which had been degassed with nitrogen overnight, was added dropwise with a syringe pump adjusted to a flow rate of 2.5 μL/min, and stirring was continued at a temperature maintained at −5° C. for 15 hours under nitrogen atmosphere. The temperature was then raised to 80° C. and the mixture was allowed to react for 10 hours. Subsequently, the solvent was distilled off under reduced pressure to obtain 5.4 g of white powder. The temperature was further raised to 180° C. to allow the resultant powder to react for 10 hours to obtain 5.2 g of white powder.

The resultant methyl galloxane showed an IR spectrum with major peaks shown below, and elemental analysis values shown below.

IR: 2978 cm$^{-1}$, 1261 cm$^{-1}$, 1220 cm$^{-1}$, 720 cm$^{-1}$, 693 cm$^{-1}$, 582 cm$^{-1}$

Elemental analysis values: C: 12.4%, H: 3.49%, Ga: 66.9%

For the resultant alkyl metalloxane compounds, Ga and Al contents (% by weight), and the molar ratio of Ga to Al are shown in Table 1.

TABLE 1

| | Catalytic component | Ga (wt %) | Al (wt %) | Ga/Al Molar ratio |
|---|---|---|---|---|
| Example 1 | A | 9.6 | 32.2 | 0.1150 |
| Example 2 | B | 6.4 | 34.4 | 0.0718 |
| Example 3 | C | 0.4 | 30.4 | 0.0051 |
| Example 4 | D | 1.4 | 31.8 | 0.0170 |
| Example 5 | E | 2.0 | 27.4 | 0.0282 |
| Example 6 | F | 25.5 | 21.9 | 0.4491 |
| Comparative Example 1 | G | 66.9 | — | — |

Example 11

A four-necked 300-mL flask with a thermometer and a rotator was dried under reduced pressure, and then purged with nitrogen. To the flask, 0.508 g of catalytic component D (the total moles of Ga and Al were 6.09 mmol), 148 mL of dehydrated toluene, and 1.9 mL of a solution of titanocene dichloride in toluene (containing 0.61 μmol of titanocene dichloride) were added. The temperature was raised to 70° C., the internal temperature was allowed to stabilize before ethylene was introduced, and a polymerization reaction was carried out for 15 min while normal pressure was maintained. The polymerization solution was then immediately introduced into a mixed solution of hydrochloric acid and methanol, and the resultant polymer was allowed to precipitate. The precipitate was dried at 40° C. under reduced pressure to yield 0.372 g of a polymer. For the resultant polymer, the number-average molecular weight (Mn) and the weight-average molecular weight (Mw) were measured using GPC, and the molecular weight distribution (Mw/Mn) was calculated. The results are shown in Table 2.

Example 12

A four-necked 300-mL flask with a thermometer and a rotator was dried under reduced pressure, and then purged with nitrogen. To the flask, 0.198 g of catalytic component B (the total moles of Ga and Al were 2.71 mmol), 149 mL of dehydrated toluene, and 0.84 mL of a solution of titanocene dichloride in toluene (containing 0.27 μmol of titanocene dichloride) were added. The temperature was raised to 50° C., the internal temperature was allowed to stabilize before ethylene was introduced, and a polymerization reaction was carried out for 16 min while normal pressure was maintained. The polymerization solution was then immediately introduced into a mixed solution of hydrochloric acid and methanol, and the resultant polymer was allowed to precipitate. The precipitate was dried at 40° C. under reduced pressure to yield 0.08 g of a polymer. For the resultant polymer, the number-average molecular weight (Mn) and the weight-average molecular weight (Mw) were measured using GPC, and the molecular weight distribution (Mw/Mn) was calculated. The results are shown in Table 2.

Comparative Example 11

A four-necked 300-mL flask with a thermometer and a rotator was dried under reduced pressure, and then purged with nitrogen. To the flask, 6.07 mmol based on Al atom of methyl aluminoxane (MAO: TMAO-212 by Tosoh Finechem), 143 mL of dehydrated toluene, and 1.90 mL of a solution of titanocene dichloride in toluene (containing 0.61 μmol in titanocene dichloride) were added. The temperature was raised to 50° C., the internal temperature was allowed to stabilize before ethylene was introduced, and a polymerization reaction was carried out for 15 min while normal pressure was maintained. The polymerization solution was then immediately introduced into a mixed solution of hydrochloric acid and methanol, and the resultant polymer was allowed to precipitate. The precipitate was dried at 40° C. under reduced pressure to yield 0.309 g of a polymer. For the resultant polymer, the number-average molecular weight (Mn) and the weight-average molecular weight (Mw) were measured using GPC, and the molecular weight distribution (Mw/Mn) was calculated. The results are shown in Table 2.

Comparative Example 12

A 200-ml autoclave with a thermometer and a rotator was dried under reduced pressure, and then purged with nitrogen. To the autoclave, 1.79 mmol based on Ga atom of catalytic component G, 47 mL of dehydrated toluene, and 3.20 mL of a solution of titanocene dichloride in toluene (containing 0.184 μmol of titanocene dichloride) were added. The temperature was raised to 70° C., and the internal temperature was allowed to stabilize before ethylene was introduced to purge the autoclave, and a pressure was applied to the autoclave to reach a gauge pressure of 0.07 MPa. The mixture was allowed to react for 30 min at 70° C. while the pressure was maintained at 0.07 MPa. Subsequently, the reaction solution was immediately introduced into a mixed solution of hydrochloric acid and methanol, but no polymer was obtained.

TABLE 2

| | Co-catalyst | | Primary catalyst | | Yield | Activity ($\times 10^6$ g/ mol-Ti·hr) | Mn ($\times 10^5$) | Mw ($\times 10^5$) | Mw/Mn |
|---|---|---|---|---|---|---|---|---|---|
| | Component | (mmol) | Component | ($\times 10^{-4}$ mmol) | (g) | | | | |
| Example 11 | Catalytic component D | 6.09 | $Cp_2TiCl_2$ | 6.1 | 0.372 | 2.4 | 0.58 | 4.9 | 8.4 |
| Example 12 | Catalytic component B | 2.71 | $Cp_2TiCl_2$ | 2.7 | 0.08 | 1.1 | 1.2 | 9.9 | 8.1 |
| Comparative Example 11 | MAO | 6.07 | $Cp_2TiCl_2$ | 6.1 | 0.309 | 2.0 | 5.1 | 8.7 | 1.7 |
| Comparative Example 12 | Catalytic component G | 1.79 | $Cp_2TiCl_2$ | 1.84 | N.D. | — | — | — | — |

The results in Table 2 show that the alkyl metalloxane compound containing the alkyl aluminoxane structural units and the alkyl galloxane structural units when used as a co-catalyst produces a polymer with a broader molecular weight distribution even when the alkyl metalloxane compound is used in combination with a typical metallocene compound as a primary catalyst than when MAO, a typical co-catalyst, is used. Also, the results show that methyl galloxane (catalytic component G) itself has no auxiliary catalytic activity.

Example 13

A four-necked 300-mL flask with a thermometer and a rotator was dried under reduced pressure, and then purged with nitrogen. To the flask, 0.239 g of catalytic component C (the total moles of Ga and Al were 2.71 mmol), 141 mL of dehydrated toluene, and 9.0 mL of a solution of zirconocene dichloride in toluene (containing 0.268 μmol of zirconocene dichloride) were added. The temperature was raised to 50° C., the internal temperature was allowed to stabilize before ethylene was introduced, and a polymerization reaction was carried out for 12 min while normal pressure was maintained. The polymerization solution was then immediately introduced into a mixed solution of hydrochloric acid and methanol, and the resultant polymer was allowed to precipitate. The precipitate was dried at 40° C. under reduced pressure to yield 0.356 g of a polymer. For the resultant polymer, the number-average molecular weight (Mn) and the weight-average molecular weight (Mw) were measured using GPC, and the molecular weight distribution (Mw/Mn) was calculated. The results are shown in Table 3.

Example 14

A four-necked 300-mL flask with a thermometer and a rotator was dried under reduced pressure, and then purged with nitrogen. To the flask, 0.204 g of catalytic component A (the total moles of Ga and Al were 2.72 mmol), 141 mL of dehydrated toluene, and 9.00 mL of a solution of zirconocene dichloride in toluene (containing 0.268 μmol of zirconocene dichloride) were added. The temperature was raised to 50° C., the internal temperature was allowed to stabilize before ethylene was introduced, and a polymerization reaction was carried out for 15 min while normal pressure was maintained. The polymerization solution was then immediately introduced into a mixed solution of hydrochloric acid and methanol, and the resultant polymer was allowed to precipitate. The precipitate was dried at 40° C. under reduced pressure to yield 0.068 g of a polymer. For the resultant polymer, the number-average molecular weight (Mn) and the weight-average molecular weight (Mw) were measured using GPC, and the molecular weight distribution (Mw/Mn) was calculated. The results are shown in Table 3.

Example 15

A four-necked 300-mL flask with a thermometer and a rotator was dried under reduced pressure, and then purged with nitrogen. To the flask, 0.236 g of catalytic component F (the total moles of Ga and Al were 2.77 mmol), 140 mL of dehydrated toluene, and 10.0 mL of a solution of zirconocene dichloride in toluene (containing 0.274 µmol of zirconocene dichloride) were added. The temperature was raised to 50° C., and the internal temperature was allowed to stabilize before ethylene was introduced, and a polymerization reaction was carried out for 30 min while normal pressure was maintained. The polymerization solution was then immediately introduced into a mixed solution of hydrochloric acid and methanol, and the resultant polymer was allowed to precipitate. The precipitate was dried at 40° C. under reduced pressure to yield 0.006 g of a polymer.

Comparative Example 13

A four-necked 300-mL flask with a thermometer and a rotator was dried under reduced pressure, and then purged with nitrogen. To the flask, 5.95 mmol based on Al atom of methyl aluminoxane (MAO: TMAO-212 by Tosoh Finechem), 143 mL of dehydrated toluene, and 2.00 mL of a solution of zirconocene dichloride in toluene (containing 0.595 µmol of titanocene dichloride) were added. The temperature was raised to 50° C., the internal temperature was allowed to stabilize before ethylene was introduced, and a polymerization reaction was carried out for 12 min while normal pressure was maintained. The polymerization solution was then immediately introduced into a mixed solution of hydrochloric acid and methanol, and the resultant polymer was allowed to precipitate. The precipitate was dried at 40° C. under reduced pressure to yield 0.758 g of a polymer. For the resultant polymer, the number-average molecular weight (Mn) and the weight-average molecular weight (Mw) were measured using GPC, and the molecular weight distribution (Mw/Mn) was calculated. The results are shown in Table 3.

Comparative Example 14

A 200-ml autoclave with a thermometer and a rotator was dried under reduced pressure, and then purged with nitrogen. To the autoclave, 1.79 mmol based on Ga atom of catalytic component G, 43 mL of dehydrated toluene, and 7.00 mL of a solution of zirconocene dichloride in toluene (containing 0.186 mol of zirconocene dichloride) were added. The temperature was raised to 70° C., the internal temperature was allowed to stabilize before ethylene was introduced to purge the autoclave, and a pressure was applied to the autoclave to reach a gauge pressure of 0.07 MPa. The mixture was allowed to react at 70° C. for 30 min while the pressure was maintained at 0.07 MPa, and the polymerization solution was immediately introduced into a mixed solution of hydrochloric acid and methanol, but no polymer was obtained.

Comparative Example 15

A 200-ml autoclave with a thermometer and a rotator was dried under reduced pressure, and then purged with nitrogen. To the autoclave, 1.89 mmol based on Al atom of methyl aluminoxane (MAO: TMAO-212 by Tosoh Finechem), 88 mL of dehydrated toluene, and 7.00 mL of a solution of zirconocene dichloride in toluene (containing 0.186 µmol of zirconocene dichloride) were added. The temperature was raised to 70° C., the internal temperature was allowed to stabilize before ethylene was introduced to purge the autoclave, and a pressure was applied to the autoclave to reach a gauge pressure of 0.07 MPa. A polymerization reaction was carried out at 70° C. for 10 min while the pressure was maintained at 0.07 MPa. The polymerization solution was then immediately introduced into a mixed solution of hydrochloric acid and methanol, and the resultant polymer was allowed to precipitate. The precipitate was dried at 40° C. under reduced pressure to yield 1.01 g of a polymer. For the resultant polymer, the number-average molecular weight (Mn) and the weight-average molecular weight (Mw) were measured using GPC, and the molecular weight distribution (Mw/Mn) was calculated. The results are shown in Table 3.

TABLE 3

| | Co-catalyst | | Primary catalyst | | Yield | Activity ($\times 10^6$ g/ mol-Zr · hr) | Mn ($\times 10^5$) | Mw ($\times 10^5$) | Mw/Mn |
|---|---|---|---|---|---|---|---|---|---|
| | Component | (mmol) | Component | ($\times 10^{-4}$ mmol) | (g) | | | | |
| Example 13 | Catalytic component C | 2.71 | $Cp_2ZrCl_2$ | 2.68 | 0.356 | 6.6 | 1.8 | 5.9 | 3.3 |
| Example 14 | Catalytic component A | 2.72 | $Cp_2ZrCl_2$ | 2.68 | 0.068 | 1.0 | 0.99 | 5.1 | 5.2 |
| Comparative Example 13 | MAO | 5.95 | $Cp_2ZrCl_2$ | 5.95 | 0.758 | 6.4 | 1.0 | 2.5 | 2.5 |
| Comparative Example 14 | Catalytic component G | 1.79 | $Cp_2ZrCl_2$ | 1.86 | N.D. | — | — | — | — |
| Comparative Example 15 | MAO | 1.89 | $Cp_2ZrCl_2$ | 1.86 | 1.01 | 33 | 1.2 | 2.7 | 2.3 |

Example 21

A four-necked 300-mL flask with a thermometer and a rotator was dried under reduced pressure, and then purged with nitrogen. To the flask, 0.199 g of catalytic component B (the total moles of Ga and Al were 2.72 mmol), 119 mL of dehydrated toluene, and 30 mL of styrene were added. The temperature was raised to 70° C., and ethylene was introduced to purge the system. The internal temperature was allowed to stabilize before 0.84 mL of a solution of titanocene dichloride in toluene (containing 0.27 µmol of titanocene dichloride) was added. Ethylene was introduced while normal pressure was maintained, and a polymerization reaction was carried out at 70° C. for 30 min. The polymerization solution was then immediately introduced into a mixed solution of hydrochloric acid and methanol, and the resultant polymer was allowed to precipitate. The precipitate was dried at 40° C. under reduced pressure to yield 0.172 g of a polymer. The resultant copolymer was subjected to NMR measurement to calculate its styrene content (St content in mol %) and isotactic dyad fraction. The results are shown in Table 4.

Example 22

A 200-ml autoclave with a thermometer and a rotator was dried under reduced pressure, and then purged with nitrogen. To the autoclave, 0.140 g of catalytic component A (the total moles of Ga and Al were 1.86 mmol), 32 mL of dehydrated toluene, and 20 mL of styrene were added, and the temperature was raised to 70° C. The internal temperature was allowed to stabilize before 8.0 mL of a solution of titanocene dichloride in toluene (containing 4.6 μmol of titanocene dichloride) was added. To this, ethylene was immediately introduced to purge the autoclave, and a pressure was applied to reach a gauge pressure of 0.2 MPa. While the pressure is maintained at 0.2 MPa, a polymerization reaction was carried out at 70° C. for 1 hour. The polymerization solution was introduced into a mixed solution of hydrochloric acid and methanol, and the resultant polymer was allowed to precipitate. The precipitate was dried at 40° C. under reduced pressure to yield 0.107 g of a polymer. The resultant copolymer was subjected to NMR measurement to calculate its styrene content (St content in mol %) and isotactic dyad fraction. The results are shown in Table 4.

Comparative Example 21

A four-necked 300-mL flask with a thermometer and a rotator was dried under reduced pressure, and then purged with nitrogen. To the flask, 2.75 mmol based on Al atom of methyl aluminoxane (TMAO-212 by Tosoh Finechem), 112 mL of dehydrated toluene, and 30 mL of styrene were added. The temperature was raised to 70° C., and ethylene was introduced to purge the system. The internal temperature was allowed to stabilize before 0.85 mL of a solution of titanocene dichloride in toluene (containing 0.27 μmol of titanocene dichloride) was added. While normal pressure was maintained, ethylene was introduced, and a polymerization reaction was carried out at 70° C. for 30 min. The polymerization solution was then immediately introduced into a mixed solution of hydrochloric acid and methanol, and the resultant polymer was allowed to precipitate. The precipitate was dried at 40° C. under reduced pressure to yield 0.068 g of a polymer. The resultant copolymer was subjected to NMR measurement to calculate its styrene content (St content in mol %). The results are shown in Table 4.

Comparative Example 22

A four-necked 300-mL flask with a thermometer and a rotator was dried under reduced pressure, and then purged with nitrogen. To the flask, 2.67 mmol based on Ga atom of catalytic component G, 119 mL of dehydrated toluene, and 30 mL of styrene were added. The temperature was raised to 70° C., and ethylene was introduced to purge the system. The internal temperature was allowed to stabilize before 0.85 mL of a solution of titanocene dichloride in toluene (containing 0.27 μmol of titanocene dichloride) was added. While normal pressure was maintained, ethylene was introduced, and a polymerization reaction was carried out at 70° C. for 30 min. The polymerization solution was immediately introduced into a mixed solution of hydrochloric acid and methanol, but no polymer was obtained.

Comparative Example 23

A four-necked 300-mL flask with a thermometer and a rotator was dried under reduced pressure, and then purged with nitrogen. To the flask, 173 μmol based on Ga atom of catalytic component G, and 2.50 mmol based on Al atom of methyl aluminoxane (MAO: TMAO-212 by Tosoh Finechem) were added (the total moles of Ga and Al were 2.67 mmol) in a manner to have the same molar ratio of Ga to Al as that of catalytic component B. To this, 108 mL of dehydrated toluene and 30 mL of styrene were added, the temperature was raised to 70° C., and ethylene was introduced to purge the system. The internal temperature was allowed to stabilize, and 4.70 mL of a solution of titanocene dichloride in toluene (containing 0.27 μmol of titanocene dichloride) was added. While normal pressure was maintained, ethylene was introduced, and a polymerization reaction was carried out at 70° C. for 30 min. The polymerization solution was then immediately introduced into a mixed solution of hydrochloric acid and methanol, and the resultant polymer was allowed to precipitate. The precipitate was dried at 40° C. under reduced pressure to yield 0.058 g of a polymer. The resultant copolymer was subjected to NMR measurement to calculate its styrene content (St content in mol %). The results are shown in Table 4.

TABLE 4

| | Co-catalyst | | Primary catalyst | | Yield | Activity ($\times 10^6$ g/ mol-Ti · hr) | St content (mol %) | Isotactic dyad fraction |
|---|---|---|---|---|---|---|---|---|
| | Component | (mmol) | Component | ($\times 10^{-4}$ mmol) | (g) | | | |
| Example 21 | Catalytic component B | 2.72 | $Cp_2TiCl_2$ | 2.7 | 0.172 | 1.3 | 42 | 0.73 |
| Example 22 | Catalytic component A | 1.86 | $Cp_2TiCl_2$ | 46 | 0.107 | 0.023 | 72 | 0.77 |
| Comparative Example 21 | MAO | 2.75 | $Cp_2TiCl_2$ | 2.7 | 0.068 | 0.50 | 42 | — |
| Comparative Example 22 | Catalytic component G | 2.67 | $Cp_2TiCl_2$ | 2.7 | N.D. | — | — | — |
| Comparative Example 23 | Catalytic component G + MAO | 2.67 | $Cp_2TiCl_2$ | 2.7 | 0.058 | 0.43 | 95 | — |

In Examples 21 and 22, ethylene-styrene copolymers with a high stereoregularity were obtained. In Comparative Examples 21 and 23, where methyl aluminoxane was used as a co-catalyst, non-stereoregular copolymers were obtained. In Comparative Example 22, where methyl galloxane (catalytic component G) was used as a co-catalyst, no copolymer was obtained. In Comparative Example 23, where a mixture of methyl aluminoxane and methyl galloxane (catalytic component G) were used as a co-catalyst, a copolymer was obtained. The results in Comparative Examples 21 and 22 indicate that methyl aluminoxane served as a co-catalyst.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A method of producing an alkyl metalloxane compound, comprising:
   reacting trialkyl gallium, trialkyl aluminum, and water.

2. The method according to claim 1, comprising reacting trialkyl gallium and water to obtain a partially hydrolyzed product, and reacting the partially hydrolyzed product and trialkyl aluminum.

3. The method according to claim 2, wherein trialkyl gallium and water is reacted in a molar ratio of water to trialkyl gallium of 2 or less.

4. The method according to claim 1, wherein trialkyl gallium and water is reacted in a molar ratio of water to trialkyl gallium of 2 or less.

5. An alkyl metalloxane compound comprising one or more alkyl aluminoxane structural units, and one or more alkyl galloxane structural units per molecule.

6. The alkyl metalloxane compound according to claim 5, having a ratio of a total number of the one or more alkyl galloxane structural units to a total number of the one or more alkyl aluminoxane structural units per molecule of the alkyl metalloxane compound that is 0.001 or more and 1.7 or less.

7. The alkyl metalloxane compound according to claim 5, wherein each of the one or more alkyl aluminoxane structural units and the one or more alkyl galloxane structural units contains an alkyl group with a carbon number of 1 to 6.

8. The alkyl metalloxane compound according to claim 7, having a ratio of a total number of the one or more alkyl galloxane structural units to a total number of the one or more alkyl aluminoxane structural units per molecule of the alkyl metalloxane compound that is 0.001 or more and 1.7 or less.

9. A co-catalyst of a metallocene catalyst comprising the alkyl metalloxane compound of claim 5.

10. An olefin polymerization catalyst comprising the alkyl metalloxane compound of claim 5, and a metallocene compound.

11. The olefin polymerization catalyst according to claim 10, wherein the metallocene compound contains at least one selected from the group consisting of zirconium and titanium.

12. The olefin polymerization catalyst according to claim 10, wherein the metallocene compound contains titanium.

13. The olefin polymerization catalyst according to claim 12, wherein the catalyst is used for a copolymerization of an aromatic vinyl compound and at least one monomer selected from ethylene or α-olefin.

14. A method of producing a polyolefin comprising contacting the olefin polymerization catalyst according to claim 10 and an olefin compound.

15. A method of producing a copolymer comprising contacting the olefin polymerization catalyst according to claim 10, an aromatic vinyl compound, and at least one monomer selected from ethylene or α-olefin.

16. The method of producing a copolymer according to claim 15, wherein the metallocene compound contains titanium.

* * * * *